Patented June 28, 1949

2,474,780

UNITED STATES PATENT OFFICE 2,474,780

AZO COMPOUNDS FROM 1-N-MORPHOLINO-2-NITRO PROPANE

Edward F. Degering, La Fayette, Ind., and Gerhard van Biema, Jackson Heights, N. Y., assignors to Purdue Research Foundation, La Fayette, Ind., a corporation of Indiana No Drawing. Application August 17, 1945, Serial No. 611,264

6 Claims. (Cl. 260—176)

This invention relates to new nitroazo compounds and to a method for preparing them. More particularly it relates to nitroazo compounds having the following general formula.

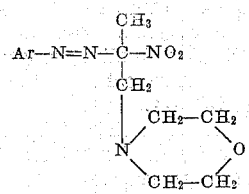

wherein Ar represents an aryl substituent group including nuclear substituted aryl groups and aryl azo aryl groups. Examples of compounds included within the scope of the above generic formula are 1-N-morpholino-2-nitro-2-phenylazopropane; 1-N-morpholino-2-nitro-2-($\beta$-naphthylazo)-propane; 1-N-morpholino-2-nitro-2-(2-carboxyphenylazo)-propane; 1-N-morpholino-2-nitro-2-(4-carboxyphenylazo)-propane; 1-N-morpholino-2-nitro-2-(4-chlorophenylazo)-propane; 1-N-morpholino-2-nitro-2-(2-nitrophenylazo)-propane; 1-N-morpholino-2-nitro-2-(3-nitrophenylazo)-propane; 1-N-morpholino-2-nitro-2-(4-nitrophenylazo)-propane; 1-N-morpholino-2-nitro-2-(2,4-dichlorophenylazo)-propane; 1-N-morpholino-2-nitro-2-(4-phenylazophenylazo)-propane and the like.

In practicing our invention 1-N-morpholino-2-nitropropane is coupled with diazotized aromatic amines of the type including mononuclear arylamines both substituted and unsubstituted, polynuclear arylamines, substituted and unsubstituted and including also azoarylamines, in acid or basic solution to yield colored solid compounds suitable for coloring silk, wool, and in some cases cotton and rayon. The 1-N-morpholino-2-nitropropane employed as a coupling component in our process can be prepared as described in the Master's Thesis of Robert Edward Meeker, dated August 1942, entitled "Condensation Reactions of Amines, Formaldehyde and Nitroparaffins," Purdue University, La Fayette, Ind.

While the coupling process of our invention may be carried out under both acid and basic conditions, we prefer to utilize an acid medium since decomposition tends to occur when basic conditions prevail, such decompositions often occurring with considerable violence. For this reason we prefer to utilize relatively strong acid solutions preferably solutions having a pH below about 4.

According to our present invention the appropriate arylamine is diazotized in the usual way, for example by first dissolving the arylamine in acid such as hydrochloric, and then adding dropwise thereto an aqueous solution of sodium nitrite. The diazonium chlorides thus produced are then poured at once into a solution of 1-N-morpholino-2-nitropropane containing an acid such as hydrochloric preferably with constant mechanical stirring. In most couplings the color develops after a few minutes of stirring at room temperatures. In some instances, however, it may be necessary to employ mild heating to accelerate the coupling, for example by the use of a steam bath. The coupled nitroazo compound may precipitate as a solid, or may remain in solution if it contains solubilizing groups as does the sulfanilic acid compound. The nitroazo compound may be recovered by any convenient means such as filtration etc.

The following specific examples will further illustrate our invention:

EXAMPLE I

*Preparation of 1-N-morpholino-2-nitro-2-phenylazopropane*

A quantity of 2.35 parts by weight of aniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. The agitation was continued for ten minutes after the addition. A previously prepared solution of 4.35 parts of 1-N-morpholino-2-nitropropane in 10 parts of concentrated hydrochloric acid (sp. g. 1.19), and 30 parts of water was subsequently poured in with continuous stirring. The solution turned first yellow, then orange, and after a few minutes a light orange precipitate was formed which was filtered off after ten minutes of stirring. The crude product, after drying in a vacuum desiccator over anhydrous potassium carbonate, corresponding to 2 parts by weight. Recrystallization three times from 30% ethanol yielded about 1.2 parts of yellow crystals melting at 125.5° C. (corr. 127.6° C.).

Analyses for nitrogen: 20.1%, 20.1%.
Theoretical amount of nitrogen: 20.15%.
Yield: 22% of theory.

EXAMPLE II

*Preparation of 1-N-morpholino-2-nitro-2-($\beta$-naphthylazo)-propane*

A quantity of 3.6 parts by weight of $\beta$-naphthylamine was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. After the addition, stirring was continued for ten more minutes. The diazotized solution was filtered, and a previously prepared solution of 4.35 parts of 1-N-morpholino-2-nitropropane in 10 parts of concentrated hydrochloric acid (sp. g. 1.19) and 30 parts of water was added to it with stirring. The solution turned a deep red immediately and after heating gently to about 35° C. a red-orange precipitate formed which tended to float on top of the reaction mixture. After standing for ten more minutes the precipitate was filtered off, dried in a vacuum desiccator and weighed. The crude material corresponded to about 5 parts by weight. It was recrystallized from 600 parts of 50% ethanol, giving 2 parts of shiny, red plates and needles melting at 149° C. A second recrystallization carried out in an identical manner yielded 1.6 parts of shiny, red plates with a melting point of 149° C. (corr. 152.1° C.).

Analyses for nitrogen: 16.4%, 16.5%.
Theoretrical percent nitrogen: 17.07%.
Yield: 25% of theory.

EXAMPLE III

*Preparation of 1-N-morpholino-2-nitro-2-(2-carboxy-phenylazo)-propane*

A quantity of 3.42 parts of anthranilic acid was suspended in 15 parts of concentrated hydrochloric acid (sp. g. 1.19) and 20 parts of water. A solution of 1.88 parts of sodium nitrite in about 30 parts of water was then added from a dropping funnel with constant stirring. After all of the suspended material had gone into solution stirring was continued for ten more minutes. A previously prepared solution of 4.35 parts of 1-N-morpholino-2-nitropropane in 10 parts of concentrated hydrochloric acid (sp. g. 1.19) and 30 parts of water was subsequently poured in with continuous stirring. Upon slight heating of the reaction mixture on the steam cone the solution turned yellow and a dark yellow precipitate appeared. Upon filtering and drying in a vacuum desiccator over potassium carbonate the crude product corresponded to about 2 parts. It was purified by recrystallization from 500 parts of 50% ethanol. The yellow, crystalline product thus obtained amounted to 1 part and had a melting point of 168.5° C. A second recrystallization carried out in an identical manner yielded to 0.5 part of fine gold plates melting at 168.5° C. (corr. 172.5° C.).

Analyses for nitrogen: 11.8%, 12.1%.
Theoretical amount of nitrogen: 17.4%.
Yield: 13% of theory.

EXAMPLE IV

*Preparation of 1-N-morpholino-2-nitro-2-(4-carboxy-phenylazo)-propane*

A quantity of 3.42 parts of p-aminobenzoic acid was suspended in 15 parts of concentrated hydrochloric acid (sp. g. 1.19) and 20 parts of water. A solution of 1.88 parts of sodium nitrite in about 30 parts of water was then added from a dropping funnel with constant stirring. The stirring was continued for ten minutes after all of the suspended material had gone into solution. The diazotized solution was poured with continuous agitation into a suspension of about 70 parts of ice in 125 parts of a 2 N solution of sodium hydroxide.

A quantity of 4.35 parts of 1-N-morpholino-2-nitro-propane was added to a solution of 1 part of sodium hydroxide in about 30 parts of water and the resulting suspension was heated until all of the nitroamine had gone into solution. The solution was cooled to room temperature in an ice bath, and then poured into the basic diazotized solution with stirring. The reaction mixture turned a deep red immediately. When, after ten minutes of stirring, it was acidified with concentrated hydrochloric acid a heavy yellow precipitate appeared. The latter was filtered off and dried over anhydrous potassium carbonate in a vacuum desiccator. The crude product corresponded to about 3 parts. Two successive recrystallizations from methanol gave 2 parts of yellow crystals melting at 193.4° C. (corr. 198.4° C.).

Analyses for nitrogen: 17.0%, 17.3%.
Theoretical amount of nitrogen: 17.4%.
Yield: 26% of theory.

EXAMPLE V

*Preparation of 1-N-morpholino-2-nitro-2-(4-chlorophenylazo)-propane*

A quantity of 3.18 parts of p-chloroaniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. Stirring was continued for ten more minutes after the addition. A previously prepared solution of 4.35 parts of 1-N-morpholino-2-nitropropane in 10 parts of concentrated hydrochloric acid (sp. g. 1.19) and 30 parts of water was subsequently poured in with constant stirring. The solution turned yellow, then orange and a bright orange solid was formed which was recovered from the solution by filtration. The product was dried over anhydrous potassium carbonate in a vacuum desiccator and recrystallized from 200 parts of 30% ethanol, yielding 2 parts of bright orange needles melting at 124.5° C. (corr. 126.8° C.).

Analyses for nitrogen: 17.6%, 17.6%.
Theoretical amount of nitrogen: 17.9%.
Yield: 26% of theory.

EXAMPLE VI

*Preparation of 1-N-morpholino-2-nitro-2-(2-nitrophenylazo)-propane*

A quantity of 3.6 parts of o-nitroaniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. Stirring was continued for ten more minutes after the addition. A previously prepared solution of 4.35 parts of 1-N-morpholino-2-nitropropane in 10 parts of concentrated hydrochloric acid (sp. g. 1.19) and 30 parts water was subsequently poured in with continued stirring. The solution soon turned yellow, then orange, and finally a bright orange solid was formed which was separated from the solution by filtration. After drying over anhydrous potassium carbonate in a vacuum desiccator the crude product amounted to about 3 parts. It was purified by recrystallization from 100 parts of 95% ethanol, yielding 2.5 parts of bright orange needles which melted at 116° C. A second and third recrystallization carried out in an identical manner gave 2.5 and 1.8 parts respectively, of orange needles melting at 116° C. (corr. 117.8° C).

Analyses for nitrogen: 21.6%, 20.9%.
Theoretical amount of nitrogen: 21.6%.
Yield: 32% of theory.

EXAMPLE VII

*Preparation of 1-N-morpholino-2-nitro-2-(3-nitrophenylazo)-propane*

A quantity of 3.5 parts of n-nitroaniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. Agitation was continued for ten minutes after the addition was completed. A previously prepared solution of 4.35 parts of 1-N-morpholino-2-nitropropane in 10 parts of concentrated hydrochloric acid (sp. g. 1.19) and 30 parts of water was subsequently poured into the diazotized solution with continuous stirring. The solution turned yellow immediately, and a yellow precipitate appeared. After stirring for twenty more minutes this precipitate was filtered off, dried in a vacuum desiccator over anhydrous potassium carbonate and weighed. The crude yellow powder amounted to 3.5 parts. Two successive recrystallizations from 400 parts of 25% ethanol yielded 3.2 and 3 parts respectively, of yellow, shiny plates melting at 127.5° C. (corr. 129.6° C.).

Analyses for nitrogen: 21.2%, 21.4%.
Theoretical amount of nitrogen: 21.6%.
Yield: 41% of theory.

EXAMPLE VIII

*Preparation of 1-N-morpholino-2-nitro-2-(4-nitrophenylazo)-propane*

A quantity of 3.5 parts of p-nitroaniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. After the addition stirring was continued for ten more minutes. A slight yellow precipitate was observed after the diazotization. A previously prepared solution of 4.35 parts of 1-N-morpholino-2-nitropropane in ten parts of concentrated hydrochloric acid (sp. g. 1.19) and 30 parts of water was then added with stirring. A heavy yellow precipitate appeared almost immediately, and after the solution had been stirred for an additional ten minutes this precipitate was isolated by filtration. It was dried over anhydrous potassium carbonate in a vacuum desiccator. The crude product corresponded to about 6 parts. It was purified by recrystallization from 300 parts of 40% ethanol, yielding 3.6 parts of golden needles with a melting point of 145° C. A second recrystallization resulted in golden plates also melting at 145° C. (corr. 147.9° C.).

Analyses for nitrogen: 26.0%, 25.9%.
Theoretical percent nitrogen: 21.6%.
Yield: 46% of theory.

EXAMPLE IX

*Preparation of 1-N-morpholino-2-nitro-2-(2,4-dichloro-phenylazo)-propane*

A quantity of 4.05 parts of 2,4-dichloroaniline was dissolved in 15 parts of concentrated hydrochloric acid (sp. g. 1.19) and 20 parts of water. A solution of 1.88 parts of sodium nitrite in about 30 parts of water was then added from a dropping funnel with constant stirring. After the addition, stirring was continued for ten more minutes. The diazotized solution was slightly turbid. A previously prepared solution of 4.35 parts of 1-N-morpholino-2-nitropropane in 10 parts of concentrated hydrochloric acid (sp. g. 1.19) and 30 parts of water was then added with stirring. The solution turned yellow, then orange, and finally an orange precipitate appeared. After ten more minutes of stirring this precipitate was collected on a filter, dried over anhydrous potassium carbonate in a vacuum desiccator and weighed. The crude product corresponded to 5 parts. Recrystallization from 300 parts of 40% ethanol gave 4 parts of orange needles melting at 91.5° C. A second recrystallization yielded a product with identical properties. (Melting point corrected to 92.6° C.)

Analyses for nitrogen: 15.5%, 15.7%.
Theoretical percent nitrogen: 16.1%.
Yield: 48% of theory.

EXAMPLE X

*Preparation of 1-N-morpholino-2-nitro-2-(4-phenylazo-phenylazo)-propane*

A quantity of 4.92 parts of p-aminoazobenzene was dissolved in 15 parts of concentrated hydrochloric acid (sp. g. 1.19) and 20 parts of water. A solution of 1.88 parts of sodium nitrate in about 30 parts of water was then added from a dropping funnel with constant stirring. After the addition stirring was continued for ten more minutes. A previously prepared solution of 4.35 parts of 1-N-morpholino-2-nitropropane in 10 parts of concentrated hydrochloric acid (sp. g. 1.19) was subsequently poured in with continued stirring. A brown precipitate was obtained which upon filtering and drying corresponded to about 8 parts. Four successive recrystallizations of one-fourth of the original precipitate from 80% ethanol yielded finally .3 part of a light brown powder melting at 163° C. (corr. 166.8° C.).

Analyses for nitrogen: 22.2%, 22.4%.
Theoretical amount of nitrogen: 22.0%.
Yield: About 80% of theory.

The compounds prepared according to the procedures described in the foregoing examples are shown in the table below in which the appearance and physical characteristics as well as the dyeing properties of the compounds are listed.

TABLE I

*Arylamines coupled with 1-N-morpholino-2-nitropropane*

| Amine Diazotized | Appearance of Azo-Compound | Corrected M. P. of Product, °C. | Per Cent N Theory | Per Cent N Found | Approximate Yield, Per Cent | Wool Color Obtained | Silk Color Obtained |
|---|---|---|---|---|---|---|---|
| Aniline | Yellow Crystals | 127.6 | 20.15 | 20.1 | 22 | Dark-Orange | Orange. |
| β-Naphthylamine | Red Plates | 152.1 | 17.07 | 16.5 | 25 | Orange-brown | Orange-brown. |
| Anthranilic Acid | Gold Plates | 172.5 | 17.40 | 12.00 | 13 | Yellow | Yellow. |
| p-Aminobenzoic Acid | Yellow Crystals | 198.4 | 17.40 | 17.2 | 26 | Yellow-orange | Yellow-orange. |
| p-Chloroaniline | Orange Crystals | 126.8 | 17.90 | 17.6 | 26 | Orange | Orange. |
| o-Nitroaniline | Orange Needles | 117.8 | 21.65 | 21.3 | 32 | Beige | Beige. |
| m-Nitroaniline | Yellow Crystals | 129.6 | 21.65 | 21.3 | 41 | Yellow | Yellow. |
| p-Nitroaniline | Yellow Needles | 147.9 | 21.65 | 26.0 | 46 | Orange | Orange. |
| 2,4-Dichloroaniline | Orange Needles | 92.6 | 16.13 | 15.6 | 48 | do | Do. |
| p-Aminoazobenzene | Lt. Brown Powder | 166.8 | 22.0 | 22.3 | 80 | | |

While the above describes the preferred embodiments of our invention, it will be understood that departures may be made therefrom within the scope of the specification and claims.

What is claimed is:

1. Nitroazo compounds having the following structural formula

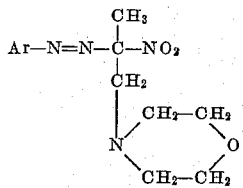

wherein Ar represents an aryl substituent group being the residue of a diazotized aryl amine.

2. 1-N-morpholino-2-nitro-2-(3-nitrophenylazo)-propane.

3. 1-N-morpholino-2-nitro-2-(2,4-dichlorophenylazo)-propane.

4. 1-N-morpholino-2-nitro-2-(4-phenylazophenylazo)-propane.

5. A process for preparing nitroazo compounds having the following general formula:

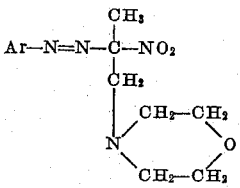

wherein Ar represents an aryl substituent group, which comprises coupling 1-N-morpholino-2-nitropropane with a diazotized aryl amine.

6. The process according to claim 5 in which the reaction is carried out in an acid solution having a pH below 4.

EDWARD F. DEGERING.
GERHARD van BIEMA.

REFERENCES CITED

The following references are of record in the file of this patent:

UNITED STATES PATENTS

| Number | Name | Date |
|---|---|---|
| 2,057,455 | Stenger | Oct. 13, 1936 |
| 2,392,611 | Nygaard | Jan. 8, 1946 |

OTHER REFERENCES

Feasley et al. in Journ. of Organic Chemistry 1943, vol. 8, pages 12–16. (Copy in Patent Office Library.)